United States Patent [19]

Wolschlager et al.

[11] Patent Number: 4,567,778
[45] Date of Patent: Feb. 4, 1986

[54] COUPLING ASSEMBLY FOR ENGINE DYNAMOMETER

[75] Inventors: Gerald J. Wolschlager; Charles A. Maas, both of Rochester, Mich.

[73] Assignee: Modular Data Systems, Inc., Utica, Mich.

[21] Appl. No.: 650,939

[22] Filed: Sep. 17, 1984

[51] Int. Cl.[4] .............................................. G01L 3/16
[52] U.S. Cl. ................................................. 73/862.09
[58] Field of Search ......................... 73/862.09–862.18

[56] References Cited

U.S. PATENT DOCUMENTS

| | | |
|---|---|---|
| 4,023,405 | 5/1977 | Larson . |
| 4,092,855 | 6/1978 | Kinney . |
| 4,182,166 | 1/1980 | Herr, Jr. . |
| 4,199,979 | 4/1980 | Herr, Jr. et al. . |
| 4,277,972 | 7/1981 | Wolschlager . |

Primary Examiner—Charles A. Ruehl
Attorney, Agent, or Firm—Cullen, Sloman, Cantor, Grauer, Scott & Rutherford

[57] ABSTRACT

A quick connect and disconnect coupling assembly for coupling a dynamometer to an engine wherein the coupling assembly may be used for both automatic and manual transmission engines. The coupling assembly includes a plurality of circumferentially spaced apart inertia actuated clamping arms which are pivotally attached to a drive member. One end of each clamping arm includes a gear section which is engageable with the engine ring gear and the other end of the clamping arm is operated on by a centrifugal mass assembly which is slidably attached to the drive member. Rotational movement of the drive member results in radial movement of the centrifugal mass assembly for applying a moment force on a respective clamping arm about its rotational axis. In order to prevent excessive clamping force when the engine speed increases, an abutment on the centrifugal mass assembly engages a stop on the drive member for bottoming or stopping the outward radial movement of the centrifugal mass assembly. Further, it has been found that when the effective center of gravity for the clamping arm is substantially coincident with its center of rotation, the clamping force remains virtually unchanged after the centrifugal mass assembly has bottomed out.

14 Claims, 7 Drawing Figures

COUPLING ASSEMBLY FOR ENGINE DYNAMOMETER

BACKGROUND OF THE INVENTION

The present invention relates to a quick connect and disconnect coupling assembly for coupling a dynamometer to an engine wherein the coupling assembly may be used for both automatic and manual transmission engines.

It is common to connect an assembled engine to a dynamometer through a connecting coupling for performing various types of testing on the engine prior to installing it in a vehicle. Since several engine models are normally built on an assembly line, including both manual and automatic transmission engines, there exists a problem in matching dynamometers to particular engine models because the connecting couplings are normally set up such that they will only accept one engine at a time. If the dynamometers and connecting couplings are set up such that they will accept only one engine model, some dynamometers may go unused for lack of particular engine models on an assembly line while stacking up of assembled engines can occur at other dynamometers. Thus, there has been a need for a coupling assembly which is not restricted to a particular engine model since it is not economically practical to stock a coupling connection for each engine variation at each dynamometer.

Accordingly, a principal object of this invention is to provide a coupling assembly which permits a universal coupling arrangement such that several engine models may be quickly coupled and tested at a single dynamometer. Further, another object of this invention is to provide a coupling assembly which may be meshingly received onto the output gear of an engine without the need for a special adaptor so that as soon as one engine is uncoupled from the dynamometer another engine may be coupled thereto with a minimum of time lapse. Still another object of the present invention is to provide a coupling assembly where the clamping force may be controlled as a function of angular velocity. Other objects and advantages of the present invention will become more apparent upon reference to the following description and disclosure.

SUMMARY OF THE INVENTION

The coupling assembly of the present invention permits quick coupling and uncoupling between a dynamometer and an engine. The coupling assembly may be used for both automatic and manual transmission engines because it utilizes the standard engine ring gear for torque transmission. Since ring gears on automatic and manual transmission engines are substantially identical, no special adaptors are required for the present coupling assembly disclosed herein when changing from a manual transmission engine to an automatic transmission engine or vice versa.

During the coupling operation, the standard locating pins on the rear engine face are aligned for engagement with openings in a bell housing enclosing the coupling assembly thereby accurately positioning the engine relative to the coupling assembly. The locating pins are normally used to position the engine properly relative to its transmission, and therefore, the coupling between the engine rear face and bell housing can be accomplished quickly and conveniently using the existing pins. Alignment between the engine and dynamometer is also accomplished by a nose piece on the end of the main shaft for the coupling assembly which is received into an existing pilot opening in the engine crankshaft.

The coupling assembly includes a coupling assembly shaft which is connected to a taper lock flange coupling on the end of a dynamometer input shaft. The coupling assembly shaft includes an exterior splined portion onto which a torsional absorber is mounted. A drive plate member is attached to the torsional absorber and the drive plate member is spaced from and connected to a speed pick-up gear member by means of spacer members.

The coupling assembly further includes a plurality of circumferentially spaced apart inertia actuated clamping arms. Each clamping arm is pivotally attached by a pin to support legs which extend from and are fixedly secured to the drive plate member. One end of each clamping arm includes a gear section which is engageable with the engine ring gear. The other end of the clamping arm is operated on by a centrifugal mass assembly which includes a plunger and compression spring.

The centrifugal mass assembly is sandwiched between the drive plate member and speed pick-up gear member for slidable movement. It includes abutment portions which are slidably movable within recesses in the drive plate member and speed pick-up gear member, respectively. Further, the centrifugal mass assembly is slidably attached to the drive plate member. Thus, rotational movement of the drive plate member results in linear movement of the centrifugal mass assembly in a radial direction.

Initially, the engine is moved into alignment with the coupling assembly such that the rear engine locating pins engage the openings in the coupling assembly bell housing and the nose piece on the coupling assembly shaft engages the pilot opening in the engine crankshaft. When the engine is aligned with the coupling assembly, the gear segments on the ends of the clamping arms interface with the engine ring gear. If the teeth on the engine ring gear do not mesh with the mating teeth on the gear segments when the engine is moved into the coupling assembly, either the drive plate member or the ring gear is rotated which will permit meshing. Since the engine ring gear and clamping arm gear segments are initially engaged, even though not fully engaged, the engine can be started from the dynamometer side by a starter or active dynamometer.

After the engine is started, its torque is transmitted from the ring gear to the gear segments and through the clamping arms, drive plate member, torsional absorber, coupling shaft, and flange coupling to the dynamometer input shaft. Thus, the engine is started with the teeth of the gear segments not being fully engaged with the teeth on the ring gear. However, after the engine is running, it is necessary to have adequate clamping forces in order to prevent separation of the teeth on the gear segments from the teeth on the engine ring gear.

The required gear clamping force occurs as a result of the physical arrangement and positioning of the pivotal clamping arms and centrifugal mass assemblies. When the engine is running, each centrifugal mass assembly is centrifugally moved radially outwardly for applying a moment force on its respective clamping arm. During low engine speeds, the centrifugal mass assembly provides sufficient clamping force so that no relative motion occurs between the teeth on the clamping arm gear segment and the teeth on the engine ring gear. However, if the clamping force is not limited by some means, it will continue to increase as the engine speed increases at a rate proportional to the square of the rotational speed. Thus, after a critical clamping force is reached, it is not necessary or desirable to continue increasing the clamping force with the centrifugal mass assembly because the clamping force would become quite excessive at high speeds.

In order to prevent excessive clamping force when the engine speed increases, the abutments on the centrifugal mass assembly engage shoulders within recesses in the drive plate and speed gear members for bottoming or stopping the outward radial movement of the centrifugal mass assembly. After the centrifugal mass assembly has bottomed out, it is still necessary to control the clamping force as a function of angular velocity. This is accomplished by controlling the location of the effective center of gravity of the clamping arm which thereby permits control of the clamping force after the centrifugal mass assembly has bottomed out. If the effective center of gravity of the clamping arm is on the engine side of its pivot pin, the clamping force will reduce with an increase in speed. Conversely, if the effective center of gravity of the clamping arm is on the dynamometer side, the clamping force will increase with speed. Further, the magnitude of the change in clamping force, as compared to the clamping force existing at the time the centrifugal mass assembly bottomed out, is controlled by the spacing between the center of gravity for the clamping arm and the center of rotation for the clamping arm. Thus, it has been found that by placing the effective center of gravity for the clamping arm on its center of rotation, the clamping force remains virtually unchanged after the centrifugal mass assembly has bottomed out.

Other advantages and meritorious features of the coupling assembly of the present invention will be more fully understood from the following detailed description of the invention, the appended claims and the drawings, a brief description of which follows.

DETAILED DESCRIPTION OF THE INVENTION

Figure 1:
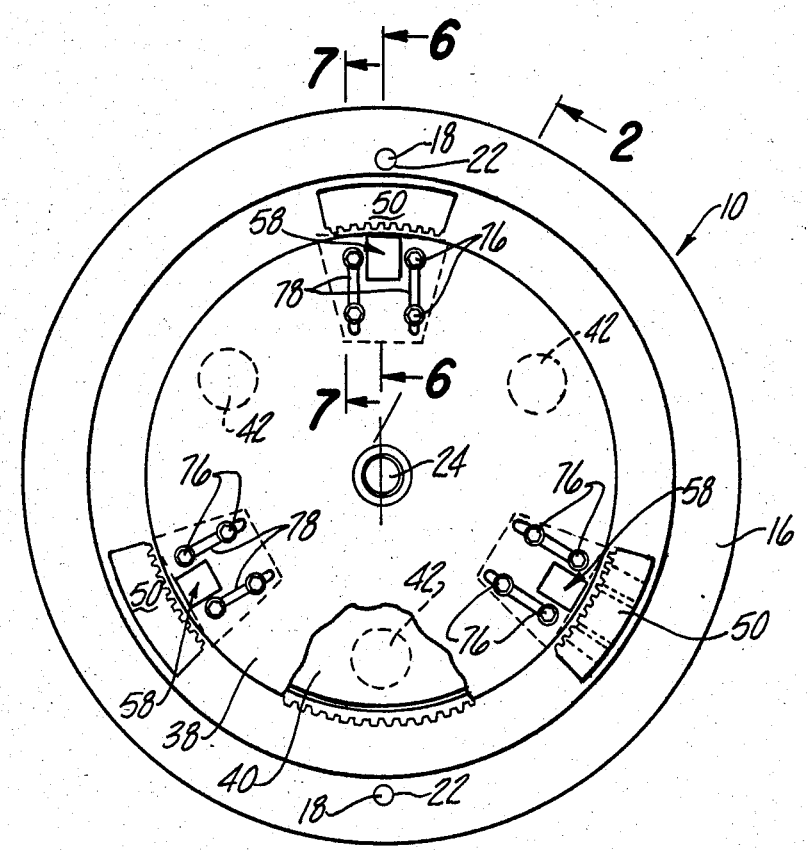
FIG. 1 is an end view of the coupling assembly of the present invention.

A coupling assembly made in accordance with the teachings of the present invention for coupling a dynamometer to an engine is illustrated in FIGS. 1-7. The coupling assembly, generally indicated by the reference numeral 10, couples a crankshaft 12 of an engine (not shown) to an input shaft 14 of a dynamometer (not shown). As is conventional, either the engine or dynamometer is mounted on a movable pallet (not shown) during the coupling and uncoupling operation hereinafter described in greater detail.

Figure 2:
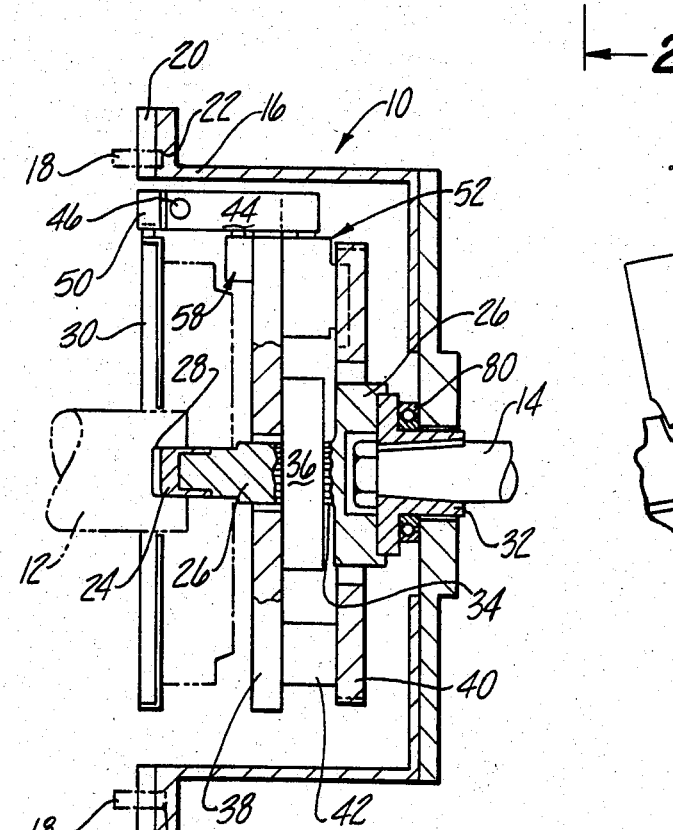
FIG. 2 is a cross-sectional side elevational view taken along line 2—2 in FIG. 1 for illustrating the coupling assembly and connection between the engine and dynamometer.

Referring to FIG. 2, coupling assembly 10 is enclosed by bell housing 16. During the coupling operation, the standard locating pins 18 on the rear engine face are aligned for engagement with openings 22 in wear plate 20 and bell housing 16 for accurately positioning the engine relative to coupling assembly 10. Pins 18 are normally used to position the engine properly relative to its transmission, and therefore, the coupling between the engine rear face and bell housing 16 can be accomplished quickly and conveniently using the existing pins 18. Alignment between the engine and dynamometer is also accomplished by the nose piece 24 on the end of coupling assembly shaft 26 which is received into the existing pilot opening 28 in crankshaft 12.

The coupling assembly 10 of the present invention may be used for both automatic and manual transmission engines because it utilizes the standard engine ring gear 30 for torque transmission. Since ring gears on automatic and manual transmission engines are substantially identical, no special adaptors are required for the present coupling assembly disclosed herein when changing from a manual transmission engine to an automatic transmission engine or vice versa.

The coupling assembly 10 includes a coupling assembly shaft 26 which is connected to a taper lock flange coupling 32 on the end of dynamometer input shaft 14. Shaft 26 includes an exterior splined portion 34 onto which a torsional absorber 36 is mounted. A drive plate member 38 is attached to torsional absorber 36 as shown in FIG. 2. Further, the drive plate member 38 is spaced from and connected to a speed pick-up gear member 40 by means of spacer members 42.

Referring now to FIGS. 1 and 4-7, the coupling assembly 10 includes a plurality of circumferentially spaced apart inertia actuated clamping arms 44. Each clamping arm 44 is pivotally attached by pin 46 to support legs 48 which extend from and are fixedly secured to drive plate member 38. One end of clamping arm 44 includes a gear section 50 which is engageable with engine ring gear 30. The other end of clamping arm 44 is operated on by a centrifugal mass assembly 52 which includes a plunger 54 and compression spring 56.

Figure 3:
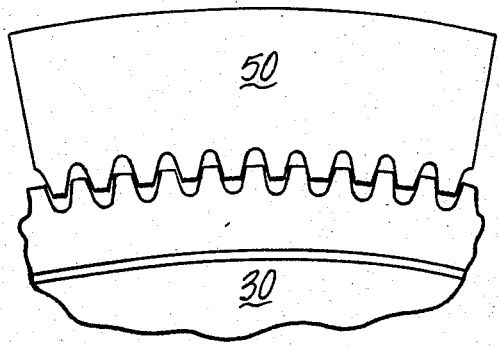
FIG. 3 is a fragmentary end view illustrating the initial meshing engagement between the teeth on a clamping arm gear segment and the engine ring gear.
Figure 4:
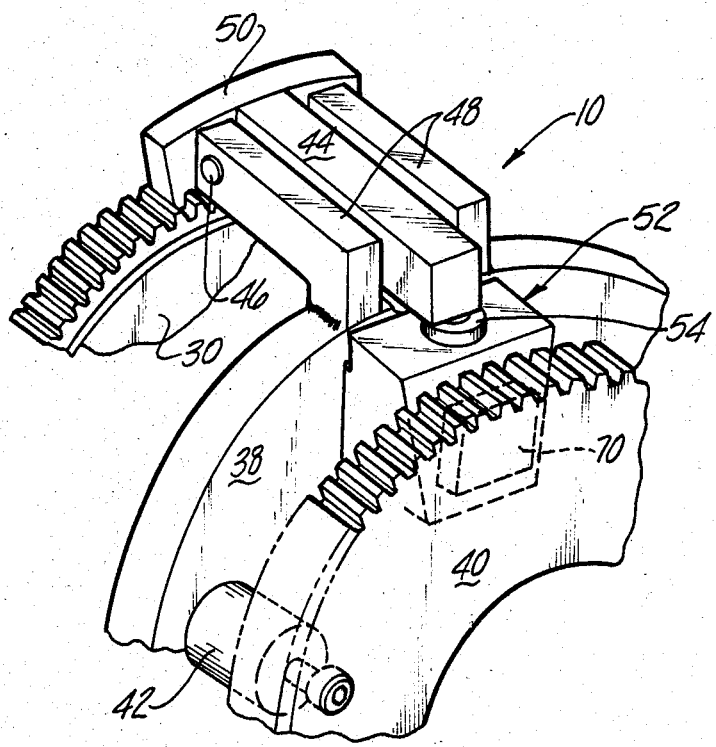
FIG. 4 is a partial perspective view of the coupling assembly.
Figure 6:
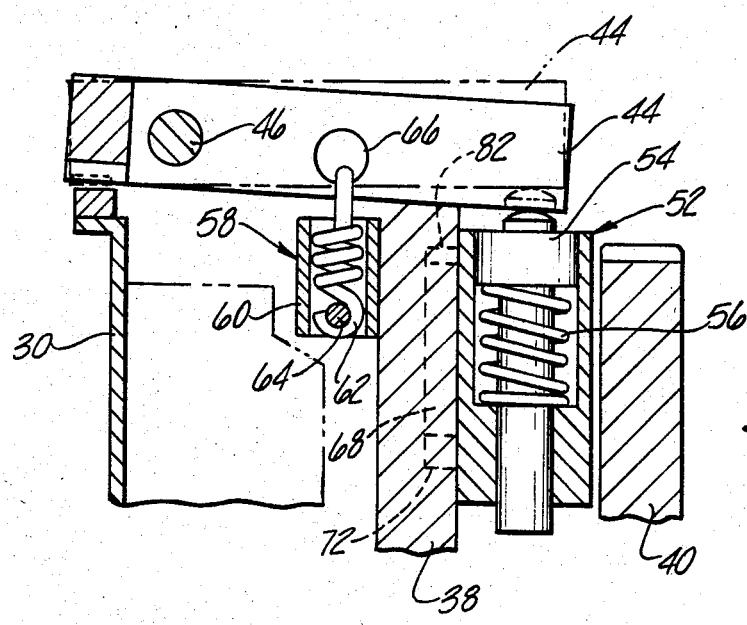
FIG. 6 is a cross-sectional side elevational view taken along line 6—6 from FIG. 1 and illustrating the unclamped and clamped positions of the clamping arm.

A spring assembly 58 is connected between drive plate member 38 and clamping arm 44 for maintaining clamping arm 44 in its unloaded position such as shown in FIGS. 2, 3, and the solid line position in FIG. 6. Spring assembly 58 includes a housing 60 which is secured to drive plate member 38 and a spring 62 within housing 60. Spring 62 is connected between housing pin 64 and opening 66 in clamping arm 44.

Figure 5:
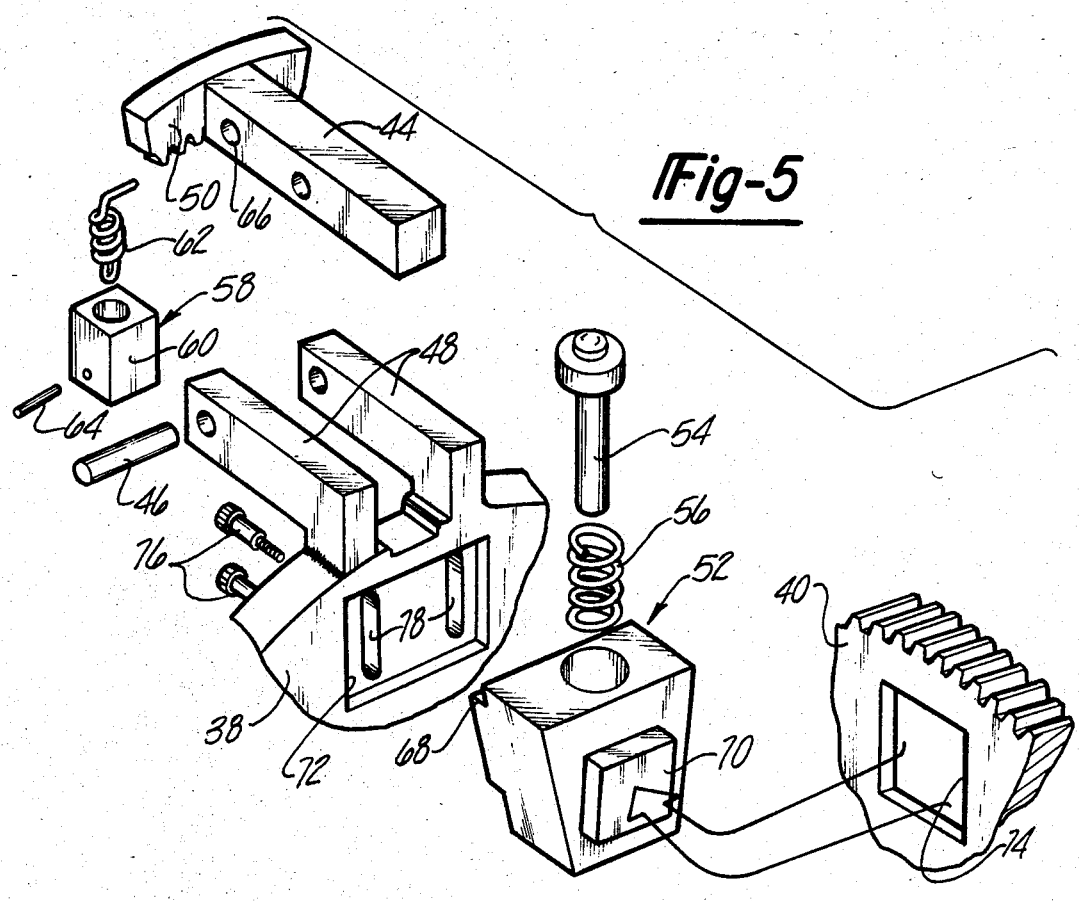
FIG. 5 is a perspective view illustrating several individual components of the coupling assembly including the clamping arm and centrifugal mass assembly.
Figure 7:
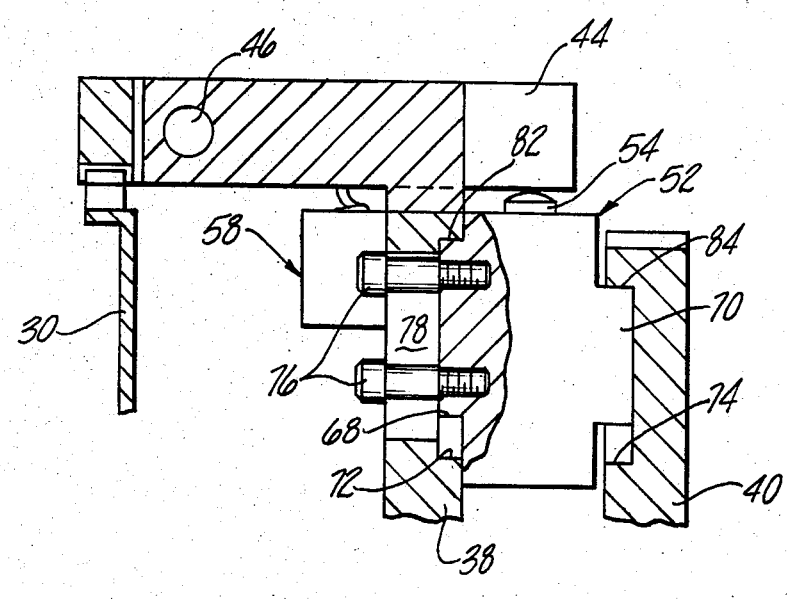
FIG. 7 is a cross-sectional side elevational view taken along line 7—7 from FIG. 1 and illustrating the loaded position of the clamping arm.

Referring now to FIGS. 5-7, centrifugal mass assembly 52 is sandwiched between drive plate 38 and speed pick-up gear member 40 for slidable movement. Centrifugal mass assembly 52 includes abutment portions 68 and 70 which are slidably movable within recesses 72 and 74 in drive plate 38 and gear 40, respectively. Further, centrifugal mass assembly 52 is slidably attached to drive plate member 38 by pins 76 which pass through slots 78. Thus, centrifugal mass assembly 52 is linearly movable in a radial direction in response to rotational movement of drive plate member 38.

Referring to FIG. 1, coupling assembly 10 includes a plurality of circumferentialy spaced apart clamping arms 44 having gear segments 50 which interface with the engine's ring gear 30 during the coupling operation. As previously described, the engine is initially moved into alignment with coupling assembly 10 such that locating pins 18 engage openings 22 in bell housing 16 and nose piece 24 engages pilot opening 28 in crankshaft 12.

When the engine is aligned with coupling assembly 10, the gear segments 50 interface with the engine ring gear 30 generally as shown in FIG. 3 and the solid line position of FIG. 6. If the teeth on the engine ring gear 30 do not mesh with the mating teeth on gear segments 50 when the engine is moved into coupling assembly 10, either drive plate member 38 or ring gear 30 is rotated approximately 2° which will permit meshing as shown in FIG. 3. Further, if ring gear 30 does not mesh immediately with gear segments 50, the dynamometer is safeguarded against thrust loading by thrust bearing 80.

When the engine is coupled to coupling assembly 10, it is necessary to start the engine. Since the ring gear 30 and gear segments 50 are initially engaged, even though not fully engaged, the engine can be started from the dynamometer side by a starter or active dynamometer. After the engine is started, its torque is transmitted from the ring gear 30 to gear segments 50 and through clamping arm 44, drive plate member 38, torsional absorber 36, coupling shaft 26, and flange coupling 32 to dynamometer input shaft 14. Thus, the engine is started with the teeth of the gear segments 50 not being fully engaged with the teeth on the ring gear 30 as shown in FIG. 3.

After the engine is running, it is necessary to have adequate clamping forces in order to prevent separation of the teeth on gear segments 50 from the teeth on ring gear 30. The required gear clamping force occurs as a result of the physical arrangement and positioning of pivotal clamping arm 44 and centrifugal mass assembly 52. When the engine is running, centrifugal mass assembly 52 is centrifugally moved radially outwardly for applying a moment force on clamping arm 44 about its pivot pin 46. That is, centrifugal mass assembly 52 slidably moves along slots 78 and plunger 54 is compressed against spring 56 which, in turn, results in the application of a moment force on the end of clamping arm 44.

During low engine speeds, centrifugal mass assembly 52 provides sufficient clamping force so that no relative motion occurs between the teeth on gear segments 50 and the teeth on ring gear 30. However, if the clamping force was not limited by some means, it would continue to increase as the engine speed increased at a rate proportional to the square of the rotational speed. Thus, after a critical clamping force is reached, it is not necessary or desirable to continue increasing the clamping force with the centrifugal mass assembly 52 because the clamping force would become quite excesssive at high speeds.

Referring now to FIGS. 6 and 7, the solid line position of clamping arm 44 in FIG. 6 illustrates the position of the clamping arm when the engine ring gear 30 is initially coupled to coupling assembly 10. The phantom line position of clamping arm 44 in FIG. 6 generally represents the position of clamping arm 44 and centrifugal mass assembly 52 when the engine is running at low speed. In order to prevent excessive clamping force when the engine speed increases, the abutments 68 and 70 on centrifugal mass assembly 52 engage shoulders 82 and 84 within drive plate recess 72 and speed gear recess 74, respectively, as shown in FIG. 7, for bottoming or stopping the outward radial movement of centrifugal mass assembly body 86.

Significantly, the present construction permits two break points in the clamping force as follows. The first break point in the clamping force occurs when the engine is running at low speed and the centrifugal mass assembly 52 is in the phantom line position of FIG. 6. In that position, plunger 54 has been compressed against spring 56 thereby creating the first break point for the clamping force. The second break point occurs at higher engine speeds when the centrifugal mass body 86 bottoms out against stops 82 and 84 as shown in FIG. 7.

However, after the centrifugal mass assembly 52 has bottomed out, it is still necessary to control the clamping force as a function of angular velocity. This is accomplished by controlling the location of the effective center of gravity of clamping arm 44 which thereby permits control of the clamping force after the centrifugal mass assembly 52 has bottomed out. If the effective center of gravity of the clamping arm 44 is on the engine side of pivot pin 46, the clamping force will reduce with an increase in speed. Conversely, if the effective center of gravity of the clamping arm 44 is on the dynamometer side, the clamping force will increase with speed. Further, the magnitude of the change in clamping force, as compared to the clamping force existing at the time the centrifugal mass assembly 52 bottomed out, is controlled by the spacing between the center of gravity for the clamping arm 44 and the center of rotation for clamping arm 44. It has been found that by placing the effective center of gravity for the clamping arm 44 on its center of rotation, i.e., on the axis of pin 46, the clamping force remains virtually unchanged after the centrifugal mass assembly 52 has bottomed out.

Another feature of the coupling assembly 10 is that the speed pick-up gear member 40 is rigidly attached to the drive plate member 38, and therefore, the speed pick-up gear member 40 is phase locked to the engine ring gear 30 thereby permitting it to be utilized in determining engine timing and load contribution by the engine's cylinders. Further, the torsional absorber 36 connects the drive plate member 38 to the coupling assembly shaft 26 for absorbing in part the shock loading that is normally experienced at the dynamometer thereby improving the fatigue life of the various components in the coupling assembly and dynamometer.

It will be apparent to those skilled in the art that the foregoing disclosure is exemplary in nature rather than limiting, the invention being limited only by the appended claims.

I claim:

1. A coupling assembly for coupling an output gear of an engine to an input shaft of a dynamometer, said coupling assembly comprising:

a drive plate member drivingly connected to said dynamometer input shaft;

at least one inertia actuated clamping arm pivotally attached to the outer periphery of said drive plate member, said clamping arm having a gear section at one end with the teeth on said gear section being engageable with the teeth on said output gear; and a centrifugal mass assembly being operable against the opposite end of said clamping arm and said centrifugal mass assembly applying a moment force on said clamping arm about its pivot axis in response to rotation of said drive plate member for providing a clamping force between the teeth on said gear section and the teeth on said output gear.

2. The coupling assembly as defined in claim 1 wherein said centrifugal mass assembly being slidably connected to said drive plate member for linear radial movement in response to rotational movement of said drive plate member and said centrifugal mass assembly being movable against a stop on said drive plate member for limiting the extent of radial movement by said centrifugal mass assembly.

3. The coupling assembly as defined in claim 2 including means for initially positioning said clamping arm such that there is less than full engagement between the teeth on said gear section and the teeth on said output gear.

4. The coupling assembly as defined in claim 3 wherein the effective center of gravity for said clamping arm controlling the clamping force as a function of angular velocity after the centrifugal mass assembly has bottomed out against said stop.

5. The coupling assembly as defined in claim 3 wherein said centrifugal mass assembly includes a plunger mounted within a housing against a compression spring with said plunger engaging the opposite end of said clamping arm.

6. The coupling assembly as defined in claim 3 including a speed pick-up gear member spaced from and connected to said drive plate member.

7. The coupling assembly as defined in claim 6 wherein said centrifugal mass assembly being sandwiched between said drive plate member and said speed pick-up gear member and said centrifugal mass assembly including at least one abutment which is engageable with said stop for limiting the extent of radial movement by said centrifugal mass assembly.

8. The coupling assembly as defined in claim 7 wherein said centrifugal mass assembly includes a plunger mounted within a housing against a compression spring with said plunger engaging the opposite end of said clamping arm.

9. The coupling assembly as defined in claim 3 wherein said drive plate member being drivingly connected to said dynamometer input shaft by means of a torsional absorber member.

10. The coupling assembly as defined in claim 9 wherein said torsional absorber member being mounted onto a splined exterior portion of a coupling shaft and said coupling shaft connected to said dynamometer input shaft.

11. The coupling assembly as defined in claim 3 including a bell housing enclosing said coupling assembly and said bell housing being engageable with locator pins on a rear face of said engine for permitting alignment between said engine and coupling assembly.

12. The coupling assembly as defined in claim 11 wherein said drive plate member being drivingly connected to said dynamometer input shaft by means of a torsional absorber member, said torsional absorber member being mounted onto a splined exterior portion of a coupling shaft and said coupling shaft connected to said dynamometer input shaft, and said coupling shaft including a nose piece member which is receivable into an opening in a crankshaft on said engine.

13. A coupling assembly for coupling an output member of an engine to an input member of a dynamometer, said coupling assembly comprising:
   a drive member drivingly connected to said dynamometer input member;
   at least one inertia actuated clamping arm pivotally attached to said drive member, said clamping arm having an engagement section at one end which is engageable with said output member;
   a centrifugal mass assembly being operable against the opposite end of said clamping arm and said centrifugal mass assembly applying a moment force on said clamping arm about its pivot axis in response to rotation of said drive member for providing a clamping force between said engagement section and said output member;
   said centrifugal mass assembly being slidably connected to said drive member for linear radial movement in response to rotational movement of said drive member and said centrifugal mass assembly being movable against a stop for limiting the extent of radial movement by said centrifugal mass assembly; and
   means for initially positioning said clamping arm such that there is less than full engagement between said clamping arm engagement section and said output member, and wherein the effective center of gravity for said clamping arm controlling the clamping force as a function of angular velocity after the centrifugal mass assembly has bottomed out against said stop.

14. The coupling assembly as defined in claim 13 wherein the effective center of gravity for said clamping arm being coincident with its center of rotation.

* * * * *